United States Patent
Pedersen

(10) Patent No.: US 9,030,545 B2
(45) Date of Patent: May 12, 2015

(54) SYSTEMS AND METHODS FOR DETERMINING HEAD RELATED TRANSFER FUNCTIONS

(75) Inventor: Thorkild Find Pedersen, Valby (DK)

(73) Assignee: GNR Resound A/S, Ballerup (DK)

( * ) Notice: Subject to any disclaimer, the term of this patent is extended or adjusted under 35 U.S.C. 154(b) by 600 days.

(21) Appl. No.: 13/342,792

(22) Filed: Jan. 3, 2012

(65) Prior Publication Data

US 2013/0169779 A1 Jul. 4, 2013

(30) Foreign Application Priority Data

Dec. 30, 2011 (DK) ................... 201101008

(51) Int. Cl.
H04N 7/18 (2006.01)
G06K 9/00 (2006.01)
G06K 9/64 (2006.01)
H04R 25/00 (2006.01)

(52) U.S. Cl.
CPC ........ *G06K 9/00221* (2013.01); *G06K 9/00362* (2013.01); *G06K 9/64* (2013.01); *H04R 25/70* (2013.01); *H04S 2420/01* (2013.01)

(58) Field of Classification Search
None
See application file for complete search history.

(56) References Cited

U.S. PATENT DOCUMENTS

| | | | |
|---|---|---|---|
| 6,966,244 B2 | 11/2005 | Herbst et al. | |
| 2004/0218771 A1 | 11/2004 | Chalupper et al. | |
| 2006/0204013 A1* | 9/2006 | Hannibal et al. | 381/60 |
| 2010/0172529 A1* | 7/2010 | Burns et al. | 381/328 |
| 2010/0177906 A1 | 7/2010 | Vetterli et al. | |
| 2012/0183161 A1* | 7/2012 | Agevik et al. | 381/303 |

FOREIGN PATENT DOCUMENTS

| | | |
|---|---|---|
| DE | 103 18 191 A1 | 7/2004 |
| EP | 1 667 487 A1 | 6/2006 |

OTHER PUBLICATIONS

Notice of Allowance dated Apr. 8, 2014, for related Japanese patent application No. JP 2012-281419, 4 pages.
Extended European Search Report dated Mar. 26, 2013 for EP Patent Application No. 12152430.
Dmitry N. Zotkin et al., "HRTF Personalization Using Anthropometric Measurements", 2003 IEEE Workshop on Applications of Signal Processing to Audio and Acoustics, Oct. 19, 2003, 4 pages.

* cited by examiner

*Primary Examiner* — William C Vaughn, Jr.
*Assistant Examiner* — Eileen Adams
(74) *Attorney, Agent, or Firm* — Vista IP Law Group, LLP

(57) ABSTRACT

A method for determining HRTF includes obtaining a plurality of reference images of different respective ears, one or more of the reference images associated with a corresponding pre-determined HRTF information, obtaining information regarding an input image that includes an image of an ear of a subject, comparing the information regarding the input image with information regarding the reference images using a processor, and selecting one of the pre-determined HRTF information based at least in part on a result of the act of comparing.

22 Claims, 5 Drawing Sheets

SYSTEMS AND METHODS FOR DETERMINING HEAD RELATED TRANSFER FUNCTIONS

RELATED APPLICATION DATA

This application claims priority to, and the benefit of, Danish Patent Application No. PA 201101008, filed on Dec. 30, 2011, pending, the entire disclosure of which is expressly incorporated by reference herein.

FIELD

This application relates generally to spatial hearing, and more specifically, systems and methods for determining head related transfer functions (HRTFs).

BACKGROUND

Spatial hearing involves measuring HRTFs of the subject being fitted. Determining HRTFs is a difficult task, and existing techniques for determining HRTFs are very time consuming, expensive, and cumbersome. HRTFs are typically measured in an anechoic chamber as the transfer function from a sound source positioned at different horizontal and vertical angels from the subject to small microphones positioned close to the subject's eardrums. Many measurement positions are obtained in order to get an accurate HRTF measurement.

Applicant of the subject application determines that new systems and methods for determining HRTF would be desirable.

SUMMARY

In accordance with some embodiments, a method for determining HRTF includes obtaining a plurality of reference images of different respective ears, one or more of the reference images associated with a corresponding pre-determined HRTF information, obtaining information regarding an input image that includes an image of an ear of a subject, comparing the information regarding the input image with information regarding the reference images using a processor, and selecting one of the pre-determined HRTF information based at least in part on a result of the act of comparing.

In one or more embodiments, at least one of the reference images may comprise an image of an ear, an image of a head, and an image of at least a part of a torso.

In one or more embodiments, the reference images may include different pairs of front and side reference images, each of the pairs being associated with a corresponding pre-determined HRTF information.

In one or more embodiments, the information regarding the input image may comprise image data for the input image.

In one or more embodiments, the information regarding the input image may comprise information extracted from the input image.

In one or more embodiments, the information extracted from the input image may comprise head size, head shape, torso size, torso shape, cavum concha height, cymba concha height, cavum concha width, fossa height, pinna height, pinna width, intertragal incisure width, cavum concha depth, or any combination thereof.

In one or more embodiments, the HRTF information may comprise one or more filter coefficients for a hearing aid.

In one or more embodiments, the act of comparing may comprise comparing the input image with the reference images to obtain different respective results representing different respective degrees of match, and the act of selecting the one of the pre-determined HRTF information may comprise selecting the HRTF information that corresponds with the one of the reference images providing the result representing the highest degree of match.

In one or more embodiments, the act of obtaining the plurality of reference images may be accomplished by accessing a database that stores the plurality of reference images.

In one or more embodiments, the act of obtaining the information regarding the input image may be performed by receiving the information regarding the input image through the Internet.

In one or more embodiments, the method may further include transmitting data regarding the selected pre-determined HRTF information to a device that is in communication with the processor.

In one or more embodiments, the method may further include using the selected pre-determined HRTF information to configure a hearing aid.

In one or more embodiments, the method may further comprise processing the selected HRTF information to obtain an interpolated HRTF information for the subject.

In accordance with other embodiments, a device for determining HRTF include a processor configured for obtaining a plurality of reference images of different respective ears, one or more of the reference images associated with a corresponding pre-determined HRTF information, obtaining information regarding an input image that includes an image of an ear of a subject, comparing the information regarding the input image with information regarding the reference images, and selecting one of the pre-determined HRTF information based at least in part on a result of the act of comparing.

In one or more embodiments, at least one of the reference images may comprise an image of an ear, an image of a head, and an image of at least a part of a torso.

In one or more embodiments, the reference images may include different pairs of front and side reference images, each of the pairs being associated with a corresponding pre-determined HRTF information.

In one or more embodiments, the information regarding the input image may comprise image data for the input image.

In one or more embodiments, the information regarding the input image may comprise information extracted from the input image.

In one or more embodiments, the information extracted from the input image may comprise head size, head shape, torso size, torso shape, cavum concha height, cymba concha height, cavum concha width, fossa height, pinna height, pinna width, intertragal incisure width, cavum concha depth, or any combination thereof.

In one or more embodiments, the HRTF information may comprise one or more filter coefficients for a hearing aid.

In one or more embodiments, the processor may be configured to perform the act of comparing by comparing the input image with the reference images to obtain different respective results representing different respective degrees of match, and wherein the processor may be configured to perform the act of selecting the one of the pre-determined HRTF information by selecting the HRTF information that corresponds with the one of the reference images providing the result representing the highest degree of match.

In one or more embodiments, the processor may be configured to perform the act of obtaining the plurality of reference images by accessing a database that stores the plurality of reference images.

In one or more embodiments, the processor may be configured to perform the act of obtaining the information regarding the input image by receiving the information regarding the input image through the Internet.

In one or more embodiments, the processor may be further configured for generating a signal to cause data regarding the selected pre-determined HRTF information to be transmitted to a device that is in communication with the processor.

In one or more embodiments, the selected pre-determined HRTF information may be for configuring a hearing aid.

In one or more embodiments, the processor may be further configured to process the selected HRTF information to obtain an interpolated HRTF information for the subject.

In accordance with other embodiments, a machine readable non-transitory medium stores a set of instructions, an execution of which causes a method to be performed, the method comprising obtaining a plurality of reference images of different respective ears, one or more of the reference images associated with a corresponding pre-determined HRTF information, obtaining information regarding an input image that includes an image of an ear of a subject, comparing the information regarding the input image with information regarding the reference images, and selecting one of the pre-determined HRTF information based at least in part on a result of the act of comparing.

In accordance with other embodiments, a method for determining HRTF includes obtaining an input image of an ear of a subject, transmitting information regarding the input image to a device for comparing the information regarding the input image with information regarding a plurality of reference images of different respective ears, one or more of the reference images associated with a pre-determined HRTF information, and receiving, from the device, data regarding one of the HRTF information that is selected based at least in part on a result of the act of comparing.

In one or more embodiments, the input image may include an image of an ear, an image of a head, and an image of at least a part of a torso.

In one or more embodiments, the reference images may include different pairs of front and side reference images, each of the pairs being associated with a corresponding pre-determined HRTF information.

In one or more embodiments, the information regarding the input image may comprise image data for the input image.

In one or more embodiments, the information regarding the input image may comprise information extracted from the input image.

In one or more embodiments, the information extracted from the input image may comprise head size, head shape, torso size, torso shape, cavum concha height, cymba concha height, cavum concha width, fossa height, pinna height, pinna width, intertragal incisure width, cavum concha depth, or any combination thereof.

In one or more embodiments, the HRTF information may comprise one or more filter coefficients for a hearing aid.

In one or more embodiments, the selected HRTF information may be for configuring a hearing aid.

In one or more embodiments, the device may comprise a non-transitory medium that stores the plurality of reference images.

In one or more embodiments, the act of obtaining the input image may be performed by receiving the input image through a port at a device.

In one or more embodiments, the data regarding the one of the HRTF information may comprise an interpolated HRTF information derived from the one of the HRTF information.

In accordance with other embodiments, a device for determining HRTF includes a processor configured for obtaining an input image of an ear of a subject, transmitting information regarding the input image to a device for comparing the information regarding the input image with information regarding a plurality of reference images of different respective ears, one or more of the reference images associated with a pre-determined HRTF information, and receiving, from the device, data regarding one of the HRTF information that is selected based at least in part on a result of the act of comparing.

In one or more embodiments, the input image may include an image of an ear, an image of a head, and an image of at least a part of a torso.

In one or more embodiments, the reference images may include different pairs of front and side reference images, each of the pairs being associated with a corresponding pre-determined HRTF information.

In one or more embodiments, the information regarding the input image may comprise image data for the input image.

In one or more embodiments, the information regarding the input image may comprise information extracted from the input image.

In one or more embodiments, the information extracted from the input image may comprise head size, head shape, torso size, torso shape, cavum concha height, cymba concha height, cavum concha width, fossa height, pinna height, pinna width, intertragal incisure width, cavum concha depth, or any combination thereof.

In one or more embodiments, the HRTF information may comprise one or more filter coefficients for a hearing aid.

In one or more embodiments, the selected HRTF information may be for configuring a hearing aid.

In one or more embodiments, the device may comprise a non-transitory medium that stores the plurality of reference images.

In one or more embodiments, the processor may be configured to perform the act of obtaining the input image by receiving the input image through a port at a device.

In one or more embodiments, the data regarding the one of the HRTF information may comprise an interpolated HRTF information derived from the one of the HRTF information.

In accordance with other embodiments, a machine readable non-transitory medium stores a set of instructions, an execution of which causes a method to be performed, the method comprising obtaining an input image of an ear of a subject, transmitting information regarding the input image to a device for comparing the information regarding the input image with information regarding a plurality of reference images of different respective ears, one or more of the reference images associated with a pre-determined HRTF information, and receiving, from the device, data regarding one of the HRTF information that is selected based at least in part on a result of the act of comparing.

Other and further aspects and features will be evident from reading the following detailed description of the embodiments.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only typical embodiments and are not therefore to be considered limiting of its scope.

DESCRIPTION OF THE EMBODIMENTS

Figure 1:
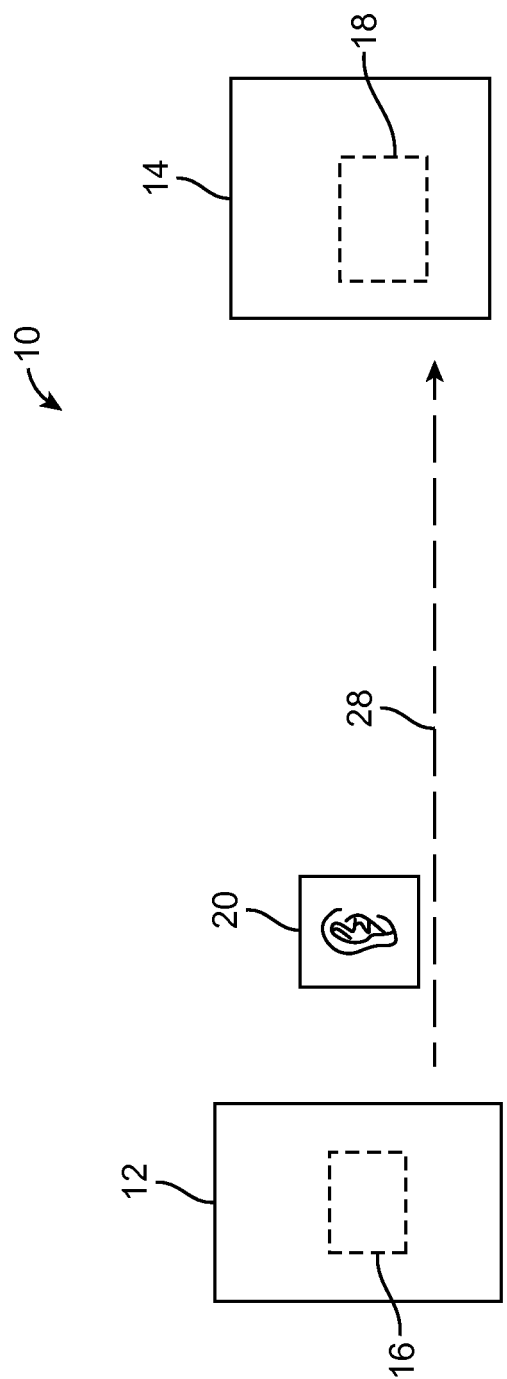
FIG. 1 illustrates a system for determining HRTF in accordance with some embodiments.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated.

FIG. 1 illustrates a system 10 for determining HRTF in accordance with some embodiments. The system 10 includes a first device 12 and a second device 14 that is in communication with the first device 12. The first device 12 includes a processor 16, and the second device 14 also includes a processor 18. As used in this specification, the term "processor" may refer to one or more processing units, such as one or more processors. The first device 12 is configured (e.g., built and/or programmed) for obtaining an input image 20 of an ear of a subject, and transmitting the input image 20 to the second device 14. The second device 14 is configured to receive the input image 20, and process the input image 20 to determine HRTF for the subject's ear. Although one first device 12 is shown in the illustrated embodiments, in other embodiments, there may be a plurality of devices 12 that are communicatively coupled to the second device 14.

The first device 12 may be different types of devices in different embodiments. In some embodiments, the first device 12 may be a handheld communication device that has a camera, such as a phone (e.g., a smart phone, an iPhone), a blackberry, or iPad. In other embodiments, the first device 12 may be a computer (such as a desktop, a laptop, a notebook, etc.). In such cases, the computer itself may be used to capture an image of the subject's ear as the input image if the computer has a camera. Alternatively, a digital camera may be used to capture an image of the subject' ear, and the image file may then be uploaded to the computer through an input port at the computer. In further embodiments, the first device 12 may be a fitting device, or any of other types of devices, that is proprietary and/or custom-made.

The second device 14 may also be different types of devices in different embodiments. In some embodiments, the second device 14 may be a computer (such as a desktop, a laptop, etc.), or a plurality of computers. In other embodiments, the second device 14 may be implemented as a database system. In other embodiments, the second device 14 may be any types of device, as long as it is capable of receiving data and processing data. Also, in one or more embodiments, the second device 14 may have a non-transitory medium associated therewith for storing data. The non-transitory medium may be located in the second device 14, or may be communicatively coupled to the second device 14.

The communication link 28 between the first device 12 and the second device may be implemented using different techniques in different embodiments. In some embodiments, the communication link 28 may be a wire or a cable that is coupled between the first device 12 and the second device 14. In other embodiments, the communication link 28 may be a wireless communication link. Also, in some embodiments, information may be transmitted between the first device 12 and the second device 14 via the Internet. In further embodiments, information may be transmitted between the first device 12 and the second device 14 using a removable storage device, such as a memory card, a USB memory stick, etc.

Figure 2:
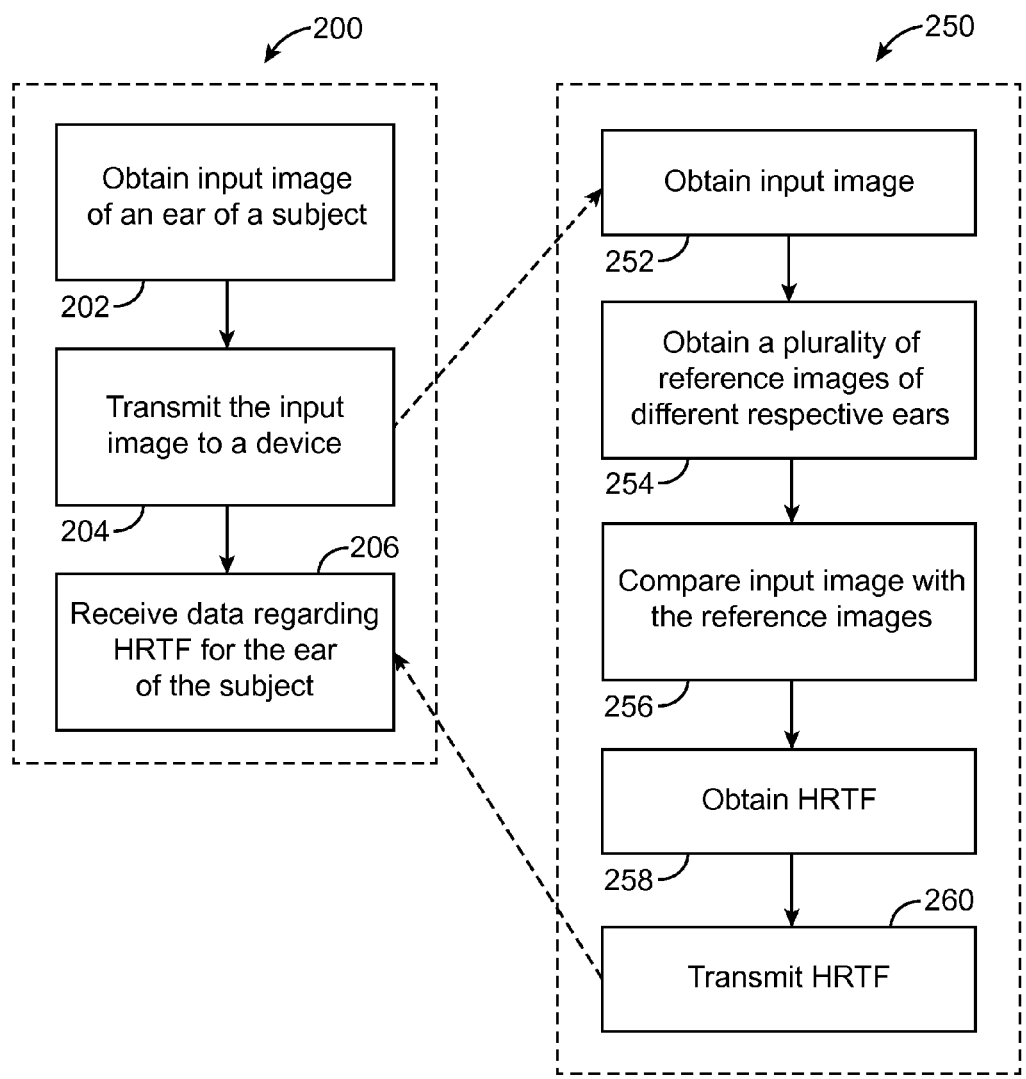
FIG. 2 illustrates a method for determining HRTF in accordance with some embodiments.

FIG. 2 illustrates a method 200 for determining HRTF using the system 10 of FIG. 1 in accordance with some embodiments. As used in this specification, the term "HRTF" or similar terms (such as HRTFs, HRTF information, head related transfer function, etc.) may refer to head related transfer function(s) itself, or it may refer to information related to HRTF(s), such as one or more parameters or one or move values that are used to represent HRTF(s), any information that is derivable from HRTF, any information that is based at least in part on HRTF, or any information that is associated with HRTF. By means of non-limiting examples, HRTF information may include one or more sets of filter coefficients for one or more input sources in a hearing instrument for restoring spatial sound cues, or may include any information that is used to represent or derive the one or more sets of filter coefficients. Also, in other examples, HRTF information may include filter(s) representing acoustic transfer functions that model transformations generated by a torso, head, and auricle of a listener on signal originating from a sound source, or any information that is used to represent or derive such filter(s). In addition, a sound source position may have an associated pair of HRTFs (a first HRTF for a right ear, and a second HRTF for a second ear). Thus, as used in this specification, "HRTF" or similar terms (such as HRTFs, HRTF information, head related transfer function, etc.) may refer to HRTF information for a right ear, for a left ear, or for both the right and left ears. Furthermore, in some embodiments, HRTF may be represented by a function that depends on a frequency of sound, and/or a position of the sound source (e.g., angle $\theta$ representing azimuth, and angle $\phi$ representing elevation of the sound source with respect to the listener). Thus, in other examples, the term "HRTF" or similar terms may refer to any of these parameters.

In some embodiments, the method 200 may be performed when a user is attempting to determine a HRTF of a subject, such as during a spatial hearing procedure. In other embodiments, the method 200 may be performed in other contexts or situations.

First, a user of the first device 12 may use the first device 12 to obtain an input image 20 of an ear of the subject (Item 202). In some embodiments, the first device 12 may be a handheld communication device, such as a phone (e.g., a smart phone, an iPhone), a blackberry, or iPad, etc. In such cases, the user may use the first device 12 to take a picture of the subject's ear. The picture is then stored in a non-transitory medium in the first device 12 as the input image 20. In other embodiments, the user may use a camera to take a picture of the subject's ear. The camera may be part of a computer, or may be communicatively coupled to a computer. In further embodiments, the user may use a separate handheld camera to take a picture of the subject's ear, and the picture file from a media storage device inside the camera may then be transferred (e.g., uploaded) to the first device 12, such as a computer, a handheld communication device, or any of other devices that has communication capability. In the above examples, the act of obtaining the input image 20 may be considered as being performed by the first device 12 (e.g., the processor 16), which obtains the input image 20 by generating it, or by receiving it.

Figure 3:
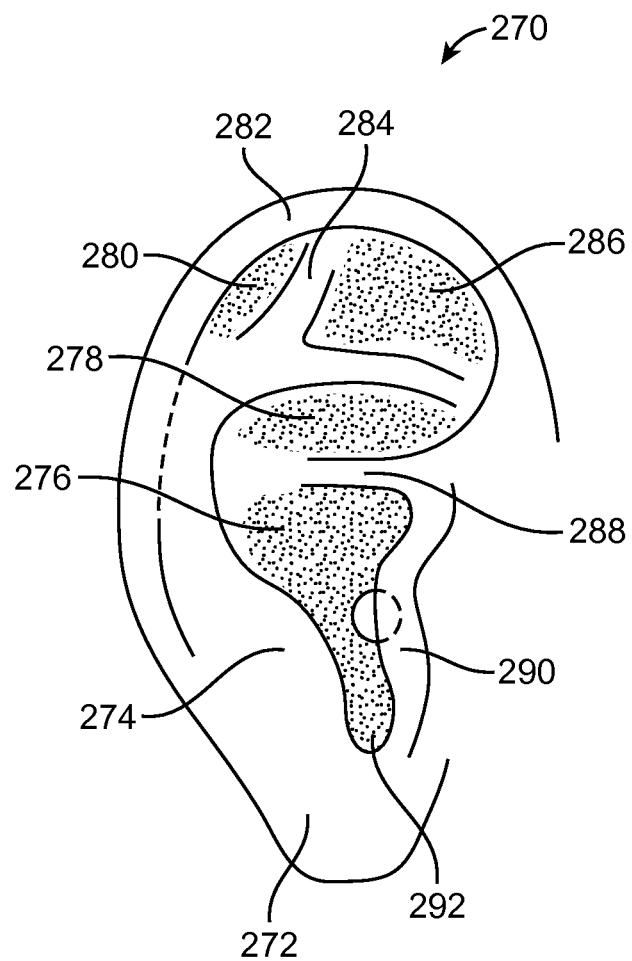
FIG. 3 illustrates an example of an input image of an ear of a subject in accordance with some embodiments.

FIG. 3 illustrates an example of an input image 20 for an ear of a subject. As shown in the figure, the input image 20 of the ear 270 may include the lobule 272, antitragus 274, cavum concha 276, cymba concha 278, scaphoid fossa 280, helix 282, antihelix 284, triangular fossa 286, crus helias 288, tragus 290, and the intertragal incisures 292. In other embodiments, the input image 20 may not include all of the above features, and may include only a subset of the above features instead.

Next, the first device 12 transmits the input image 20 to the second device 14 for comparing the input image 20 with a plurality of reference images of different respective ears (Item 204). As used in this specification, the term "reference images" or similar terms (such as "plurality of reference images") may refer to a complete set of all available reference images, or alternatively, may refer to a subset of all available reference images. In some embodiments, the act of transmitting may involve the processor 16 generating a control signal to cause the first device 12 to wirelessly transmit the input image 20 to the second device 14. In other embodiments, the act of transmitting may involve the processor 16 generating a control signal to cause the first device 12 to transmit the input image 20 to the second device 14 using a wire or a cable. Also, in one or more embodiments, the input image 20 may be transmitted from the first device 12 to the second device 14 through the Internet.

As shown in FIG. 2, after the input image 20 is transmitted to the second device 14, the second device 14 performs a method 250. First, the second device 14 obtains the input image 20 (Item 252). Such may be accomplished by the second device 14 (e.g., the processor 18 of the second device 14) receiving the input image 20 from the first device 12 in some embodiments.

Next, the second device 14 obtains reference images of different respective ears (Item 254). In some embodiments, such may be accomplished by the processor 18 of the second device 14 accessing a non-transitory medium that stores the reference images. In other embodiments, the act of obtaining reference images may be accomplished by the second device 14 (e.g., the processor 18 of the second device 14) receiving the reference images from another device (such as, from a computer, an external hard drive, a database, etc.).

Figure 4:
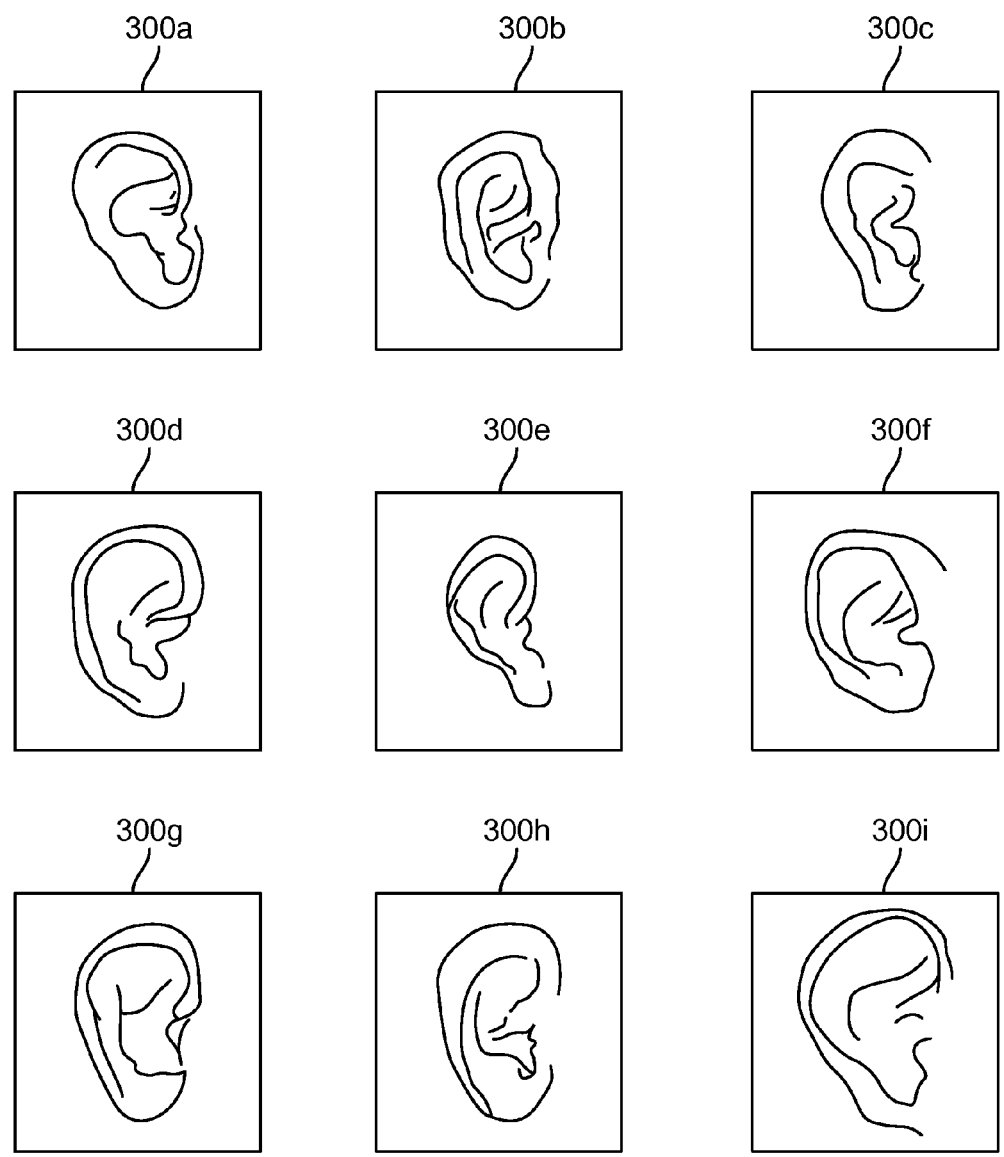
FIG. 4 illustrates examples of reference images of different respective ears in accordance with some embodiments.

In the illustrated embodiments, the reference images are stored in a non-transitory medium that is associated with the second device 14. The non-transitory medium may be inside the second device 14, or may be a storage device that is communicatively coupled to the second device 14. In either case, the non-transitory medium may be considered to be a part of the second device 14. FIG. 4 illustrates examples of reference images 300*a*-300*i* that may be stored at the second device 14. As used in this specification, information that is "stored at" a device may refer to information that is physically located at the device, or may refer to information that may be accessed by the device. Thus, the term "store at" should not be limited to information that is physically stored at a device. Although nine reference images 300 are shown in the figure, in other examples, there may be more than nine reference images 300, or fewer than nine reference images 300. As shown in the figure, each of the reference images 300 includes a picture of an ear. The features of the ears are different in different respective reference images 300. For example, the lobule, antitragus, cavum concha, cymba concha, scaphoid fossa, helix, antihelix, triangular fossa, crus helias, tragus, or any combination of the foregoing, may have size and/or shape that is different between two or more of the reference images 300.

In some embodiments, the reference images 300 stored at the second device 14 are collected over time from different fitting procedures of different subjects. Thus, as time progresses, the number of reference images 300 at the second device 14 may increase. In one implementation, the second device 14 may be accessed by different users (e.g., different operators at different fitting centers, hospitals, doctors' offices, etc.), who will upload the reference images 300, along with their corresponding HRTF information (e.g., filter coefficients, etc.), to the second device 14. For example, after a user has performed a session to determine HRTF (e.g., using traditional techniques) for a particular subject, the user may take a picture of the subject's ear(s), and transmit the picture along with the determined HRTF to the second device 14. Over time, the number of reference images 300 and their corresponding HRTFs transmitted to, and stored at, the second device 14 will increase, thereby providing a database with an extensive amount of knowledge regarding different HRTFs for different ear configurations. Also, in some embodiments, one or more of the reference images 300 may be an image of a model ear. In further embodiments, each reference image 300 may include an image of a head and an image of at least a part of a torso.

In the illustrated embodiments, each of the reference images 300 is associated with pre-determined HRTF. For example, in some embodiments, a reference image 300 may have one or more parameters for a HRTF that is associated with the image 300. For a given reference image 300, the HRTF associated with the reference image 300 was previously obtained for the ear shown in the reference image 300. Thus, the HRTF associated with the reference image 300 is "pre-determined". In some embodiments, the HRTF information may be stored at the second device 14 as part of the image file for the reference image 300. In other embodiments, the HRTF information may be stored at the second device 14 as separate files from the image files of the reference images 300. In such cases, the second device 14 may also store meta data (e.g., pointers) for associating the HRTF information with respective reference images 300. Also, in some embodiments, the pre-determined HRTF for each reference image 300 may have multiple parameters that are stored in table form, with the file name of the reference image 300 being the index in the table. In such cases, the parameters of the HRTF may be retrieved from the table by referencing the index (e.g., the file name of the corresponding reference image 300) at the table. Other techniques for associating the reference images 300 with their corresponding HRTF information may be used in other embodiments.

Returning to FIG. 2, next, the processor 18 of the second device 14 then compares the input image 20 with the reference images 300 (Item 256). In some embodiments, before the comparison between the input image 20 and the reference images 300 is performed, the input image and/or the reference images 300 may optionally be pre-processed. For example, in some embodiments, the processor 16 of the first device 12 and/or the processor 18 of the second device 14 may be configured to perform image processing to filter out noise in the input image 20, scaling the input image 20 so that the image of the ear has a certain height and width, adjusting a grey-scale of the input image 20, or a combination of the foregoing. Similarly, in some embodiments, the processor 18 of the second device 14 may be configured to perform image processing to filter out noise in the reference images 300, scaling the reference images 300 so that the respective images of the ears have a certain height and width, adjusting a grey-scale of the reference images 300, or a combination of the foregoing. In some embodiments, the pre-processing of the reference images 300 may be performed when the reference images 300 are being stored at the second device 14. In other embodiments, the pre-processing of the reference images 300 may be performed during a process to determine HRTF. In such cases, the pre-processing of the reference images 300 may be performed in response to the processor 18 receiving an input image 20 from the first device 12.

Various techniques may be employed to compare the input image 20 and a reference image 300. In some embodiments, a degree of match may be determined between the input image 20 and each of the reference images 300. The processor 18 of the second device 14 then selects the reference image 300 that provides the highest degree of match as the matching image. In some embodiments, a cross-correlation value (which may be considered an example of a degree of match) may be computed using the input image 20 and each of the reference images 300. The processor 18 of the second device 14 then selects the reference image 300 that provides the highest cross-correlation value as the matching image.

Also, in some embodiments, a pattern matching technique may be used to determine how well the input image 20 matches a given reference image 300. Any of the pattern matching techniques known in the art may be used in different embodiments.

In further embodiments, different image processing techniques may be employed to efficiently search for a best match between the input image 20 and one of the reference images 300. For example, in some embodiments, the input image 20 may be processed to obtain an exterior profile (or outline) of the subject's ear. The exterior profile of the input image is then compared with exterior profiles of different respective reference images 300 to find a subset of reference images 300 that match the exterior profile of the subject's ear. The input image 20 is then compared with the subset of reference images 300 (now considering the features within the outline of the ear) to determine a reference image 300 that best matches the input image 20.

In still further embodiments, deformation registration may be used to determine a reference image 300 that best matches the input image 20. Deformable image registration is a process or technique in which points in a first image of a first object are associated with corresponding points in a second image of a second object, wherein the first and second objects may have the same or different sizes and/or shapes. In some embodiments, a deformation registration between two images may be represented by a matrix of vectors that maps points at a first image to points at a second image. When comparing the input image 20 with the reference images 300, the processor 18 of the second device 14 may calculate matrices representing deformation registration between the input image 20 and respective ones of the reference images 300. Each of the matrices may then be used to compute a score that represents a degree of match between the input image 20 and a corresponding one of the reference images 300. In some embodiments, the score may be computed on the basis that a matrix with more vectors having non-zero values and/or vectors having higher non-zero values will have a relatively lower score. This is because more vectors mean that more points in one image need to be "moved" in order to reach the positions of the corresponding points in another image, and because a higher vector value means that the a point in one image needs to be moved further in order to reach the position of the corresponding point in another image.

In further embodiments, variants of Principal Component Analysis (PCA) may be applied to the reference images 300 and used for classifying the input image 20.

After a reference image 300 has been determined to be the best match with the input image 20, the processor 18 of the second device 14 then obtains the HRTF that is associated with the matching reference image 300 (Item 258). In the illustrated embodiments, the second device 14 is configured to obtain the HRTF by selecting (e.g., retrieving) the HRTF information that is associated with the best matching reference image 300. In some cases, since each reference image 300 is stored at the second device 14 in a way that is associated with its corresponding HRTF information, the act of obtaining HRTF by the processor 18 of the second device 14 may be considered performed when the processor 18 of the second device 14 has determined (e.g., selected) a best matching reference image 300. In other embodiments, the act of obtaining HRTF by the processor 18 of the second device 14 may be considered performed when the processor 18 accesses a non-transitory medium to retrieve the stored corresponding HRTF.

By means of non-limiting examples, the HRTF information that may be obtained by the processor 18 may include one or more sets of filter coefficients for one or more input sources in a hearing instrument for restoring spatial sound cues, or may include any information that is used to represent or derive the one or more sets of filter coefficients. Also, in other embodiments, the HRTF information that may be obtained by the processor 18 may include filter configuration and coefficients for different devices to be fitted (depending on form factor, number of microphones, receiver type, etc).

In some embodiments, when selecting the reference image 300 that best matches the input image 20, the processor 18 also considers other information, such as head size of the subject, head shape of the subject, torso size of the subject, torso shape of the subject, or any combination thereof. For example, in some embodiments, when the first device 12 transmits the input image 20 to the second device 14, the first device 12 also transmits head and torso information for the subject to the second device 14. In such cases, each of the reference images 300 stored at the second device 14 is also associated with corresponding head and torso information. During use, when the second device 14 compares the input image 20 with the reference images 300, the second device 14 also compares the head and torso information for the subject with the corresponding head and torso information that are associated with the respective reference images 300. In some embodiments, the processor 18 of the second device 14 selects the pre-determined HRTF information that is associated a corresponding reference image 300 and corresponding head and torso information providing the best match with the input image 20 and the head and torso information for the subject.

After the processor 18 of the second device 14 has obtained the HRTF, the processor 18 then transmits the HRTF information to the first device 12 (Item 260). In some embodiments, the processor 18 of the second device 14 may be configured to generate a signal to cause the second device 14 to transmit the HRTF information through a wireless network (e.g., through the Internet). In other embodiments, the processor 18 of the second device 14 may be configured to generate a signal to cause the second device 14 to transmit the HRTF information through a wire or a cable.

Returning to the method 200 in FIG. 2, the first device 12 receives, from the second device 14, data regarding HRTFs that is obtained based on a result of the act of comparing (Item 206). In some embodiments, the received data regarding the HRTF may be stored in a non-transitory medium that is associated with the first device 12. Additionally, or alternatively, the received data regarding the HRTF may be displayed on a screen (e.g., a screen at the first device 12) for presentation to the user of the first device 12. In further embodiments, the first device 12 may transmit the HRTF information for incorporation into a hearing aid device that is for the subject. For example, if the HRTF information includes filter coefficients for a hearing aid, the HRTF information may be incorporated into such hearing aid (e.g., into a processor of the hearing aid).

In some embodiments, the selected HRTF for the subject may have an associated reference image 300 that does not provide the best match with the input image 20. For example, in some cases, there may be two reference images 300 that provide close matches with the input image 20, but neither one of which provides the best match. In such cases, the HRTF for the first "matching" reference image 300 may be selected by the second device 14, and the HRTF for the second "matching" reference image 300 may be selected by the second device 14, and the second device 14 then determine HRTF based on an interpolation between the two selected pre-determined HRTFs. In some embodiments, the interpolation may be accomplished by calculating a mean value for the two HRTFs that are associated with the two respective closest matches. This technique is advantageous because in some cases, the information related to the input image may fall in between two samples in the database. In such situations, deriving a result using the two samples (e.g., by interpolation, such as mean calculation, etc.) may achieve a better matching result.

As illustrated in the above embodiments, using an image comparison technique to determine HRTF is advantageous because it obviates the need to perform complicated, cumbersome, and expensive procedures. Also, the subject is not required to perform lengthy hearing tests (which are currently required in order to obtain HRTF for an individual). Thus, embodiments of the device and method for determining HRTF save time, resources, and money.

In other embodiments, in addition to the ear, the input image 20 may also include an image of the subject's head. In such cases, the reference images 300 may also include corresponding images of different subjects' heads. During use, the processor 16 of the first device 12, and/or the processor 18 of the second device 14, may process the input image 20 to determine information that is relevant for HRTF determination. For example, the processor 16 and/or the processor 18 may perform image processing to determine head size (e.g., width), head shape, etc. The processor 18 may then select pre-determined HRTF (e.g., filter coefficients) that is stored at the second device 14 based at least in part on the determined head size and/or head shape. In one implementation, the HRTF that is selected may be the HRTF that is associated with a reference image 300 having head size and/or head shape that best match the head size and/or head shape in the input image 20, and having ear feature(s) that best match the ear feature(s) in the input image 20.

In further embodiments, the input image 20 may also include an image of the subject's head, as well as at least a part of the subject's torso (e.g., the shoulders of the subject). In such cases, the reference images 300 may also include corresponding images of different subjects' heads and their torsos. During use, the processor 16 of the first device 12, and/or the processor 18 of the second device 14, may process the input image 20 to determine information that is relevant for HRTF determination. For example, the processor 16 and/or the processor 18 may perform image processing to determine head size (e.g., width), head shape, torso width, torso depth, etc. The processor 18 may then select pre-determined HRTF (e.g., filter coefficients) that is stored at the second device 14 based at least in part on the determined head information and torso information. In one implementation, the HRTF that is selected may be the HRTF that is associated with a reference image 300 having head size and/or head shape that best match the head size and/or head shape in the input image 20, having torso size and/or torso shape that best match the torso size and/or torso shape in the input image 20, and having ear feature(s) that best match the ear feature(s) in the input image 20.

In the above embodiments, pre-determined HRTF information is selected by the processor 18 of the second device 14 based on a comparison between the input image 20 and the reference images 300. In other embodiments, pre-determined HRTF information may be selected by the processor 18 of the second device 14 based on a comparison between two input images 20 and two respective sets of reference images 300. For example, in other embodiments, the device 12 may be used to obtain two input images 20, with the first input image 20 being a front view of a subject that includes the head, ears, and at least part of the torso, and the second input image 20 being a side view of the subject that includes the head, the ear, and at least part of the torso. In such cases, two sets of reference images 300 are stored at the second device 14, with the first set of reference images 300 being front images of different persons, and the second set of reference images 300 being side images of the different persons. Each front reference image 300 may include image of a head, images of the ears, and image of at least part of the torso, of a person. Each side reference image 300 may include image of the head, image of the ear, and image of at least part of the torso, of the same corresponding person. Also, for each pair of front reference image 300 and side reference image 300 stored at the second device 14, there is corresponding HRTF information stored at the second device 14. During use, the processor 18 of the second device 14 selects HRTF information based on a first comparison of the front input image 20 with front reference images 300, and a second comparison of the side input image 20 with side reference images 300. In one implementation, the processor 18 selects the pre-determined HRTF information that is associated with the pair of front reference image 300 and side reference image 300 that best matches the pair of front input image 20 and side input image 20.

Also, in other embodiments, instead of comparing input image 20 with the reference images 300, the processor 18 of the second device 14 may be configured to compare information extracted the input image 20 with information extracted from the reference images 300, and select the pre-determined HRTF information based at least on a result of such comparison. For example, in some embodiments, the processor 16 of the first device 12 and/or the processor 18 of the second device 14 may be configured to perform image processing to extract certain information from the two input images 20 (front input image 20 and side input image 20). By means of non-limiting examples, information that may be extracted from the input images 20 may include head size (width and/or depth), head shape, torso size (width and/or depth), torso shape, cavum concha height, cymba concha height, cavum concha width, fossa height, pinna height, pinna width, intertragal incisure width, cavum concha depth, or any combination of the foregoing. Similarly, the processor 18 of the second device 12 may be configured to perform image processing to extract certain information from the reference images 300 (front reference images 300 and side reference images 300). By means of non-limiting examples, information that may be extracted from the reference images 300 may include head size (width and/or depth), head shape, torso size (width and/or depth), torso shape, cavum concha height, cymba concha height, cavum concha width, fossa height, pinna height, pinna width, intertragal incisure width, cavum concha depth, or any combination of the foregoing. During use, the processor 18 of the second device 14 selects HRTF information based on a first comparison of the front input image 20 with front reference images 300, and a second comparison of the side input image 20 with side reference images 300. In one implementation, the processor 18 selects the pre-determined HRTF information that is associated with the reference images 300 (pair of front and side reference images 300) providing information that best matches the information extracted from the pair of front input image 20 and side input image 20. It should be noted that information extracted from the input image 20 may be considered as an example of information regarding the input image 20. In another example, information regarding the input image 20 may be the input image 20 itself, in which case, the information may comprise image data for the input image 20. Similarly, information extracted from the reference image 300 may be considered as an example of information regarding the reference image 300. In another example, information regarding the reference image 300 may be the reference image 300 itself, in which case, the information may comprise image data for the reference image 300.

In one or more embodiments, the act of comparing input image 20 with reference image(s) 300 may be performed based on classification technique. For example, in some embodiments, pre-determined HRTF information may be classified based on the information extracted from the reference images 300, wherein such information may include head size (width and/or depth), head shape, torso size (width and/or depth), torso shape, cavum concha height, cymba concha height, cavum concha width, fossa height, pinna height, pinna width, intertragal incisure width, cavum concha depth, or any combination of the foregoing. In some embodiments that include a pair of reference images 300 (front and side reference images 300) associated with corresponding HRTF information, the HRTF information stored at the second device 14 may be classified based on information extracted from the pair of corresponding reference images 300. In such cases, during use, the processor 18 of the second device 14 may select one of the classified HRTF information based on a comparison of the information extracted front the input images 20 (front and side input images 20 for the subject), and information extracted from the reference images 300. In one implementation, the processor 18 selects one of the classified HRTF information that is associated with the reference images 300 (pair of front and side reference images 300) providing information that best matches the information extracted from the pair of front input image 20 and side input image 20.

In some cases, there may be two sets of information from two reference images 300 that provide a close match with the information regarding the input image 20. In such cases, the HRTF for the first "matching" reference image information may be selected by the second device 14, and the HRTF for the second "matching" reference image information may be selected by the second device 14, and the second device 14 then determine HRTF based on an interpolation between the two selected pre-determined HRTFs.

Also, in one or more embodiments, the processor 18 of the second device 14 may consider one or more parameters related to an ear canal when selecting HRTF information for the subject. For example, in some embodiments, when the pre-determined HRTF information is being stored at the second device 14, the second device 14 may also store feedback calibration measurements (if available) at the non-transitory medium, and the stored feedback calibration measurements may be linked with the corresponding HRTF information and/or the reference images 300. In one implementation, when different subjects are fitted with a hearing instrument, the feedback path from the receiver in the ear to the microphones on the instrument may be measured, and the measurement may provide a transfer function which may be used to increase the maximum stable gain of the hearing instrument by adaptive filtering. This transfer function may be correlated to the HRTF information in the sense that it embeds information on how sound changes when traveling from the microphone positioned outside the ear canal to the receiver inside the canal. During use, the processor 18 of the second device 14 selects HRTF information based on a comparison between information regarding the input image 20 (or input images 20 if there are front and side input images 20) and information regarding the reference images 300, and a comparison between feedback measurement for the subject and feedback measurements for the different subjects stored at the second device. In one implementation, the processor 18 selects the pre-determined HRTF information that is associated a best matching information from the reference image 300 (or pair of reference images 300 if there are front and side reference images 300), and a best matching corresponding feedback measurement.

In further embodiments, the selection of the pre-determined HRTF by the second device 14 may be performed without using any images. For example, in other embodiments, feedback measurements for different subjects may be stored at the second device 14, and the corresponding HRTF information may also be stored at the second device 14 in a way that are associated with the corresponding feedback measurements. During use, the processor 18 of the second device 14 obtains feedback measurement for the subject (e.g., by receiving such information from the first device 12), and selects HRTF information based on a comparison between the feedback measurement for the subject and feedback measurements for the different subjects stored at the second device 14. In one implementation, the processor 18 selects the pre-determined HRTF information that is associated with one of the pre-determined feedback measurements that best matches with the feedback measurement of the subject.

In the above embodiments, the system 10 has been described with reference to involving the first device 12 and the second device 14. In other embodiments, the system 10 may include only one device. For example, in other embodiments, the second device 14 may include a camera for capturing the input image 20 of an ear of the subject. In such cases, the first device 12 and the method 200 may not be required for obtaining HRTF. Instead, the act 252 of obtaining the input image 20 is performed by the second device 14 generating an input image 20 of the ear of the subject using a camera. Alternatively, the second device 14 may obtain the input image 20 by receiving it through a port. For example, in some embodiments, a user may take a picture of the subject's ear using a digital camera, and the picture is then uploaded to the second device 14 (e.g., through the USB port, or through a media file input port). Also, in this embodiment that does not involve the first device 12, the second device 14 may not be required to perform the act 260 of transmitting the HRTF information. In some embodiments, the obtained HRTF may be displayed at a screen (e.g., a screen at the second device 14, or a screen that is coupled to the second device 14).

In the above embodiments, the methods 200, 250 have been described with reference to comparing a two dimensional input image 20 with two dimensional reference images 300. In other embodiments, the input image 20 may be a three dimensional image, and each of the reference images 300 may be a three dimensional reference image. In such cases, the first device 12 may be used to obtain two or more two dimensional images of a subject's ear from different respective directions. The two dimensional images may then be processed to reconstruct a three dimensional input image 20 of the subject's ear. In some embodiments, the processor 16 of the first device 12 may be configured to perform the image processing to reconstruct the three dimensional input image 20. In other embodiments, the processor 16 of the first device 12 may be configured to generate signals to cause the first device 12 to transmit the images to the second device 14. The second device 14 then perform the image processing on the images to reconstruct the three dimensional input image 20. The same image processing technique may be employed to generate each of the three dimensional reference images 300 that are stored at the second device 14 (e.g., at a non-transitory medium that is in the second device 14, or that is coupled to the second device 14). After the three dimensional input image 20 of the subject's ear has been obtained (e.g., either by receiving it from the first device 12, or by reconstructing it by the second device 14), the second device 14 then compares the three dimensional input image 20 with the three dimensional reference images 300. Any of the techniques described previously may be similarly applied to perform image comparison between the images. The second device 14 then determines HRTF based on a result of the act of comparing the three dimensional input image 20 with the three dimensional reference images 300, and transmits the HRTF information to the first device 12.

Computer System Architecture

Figure 5:
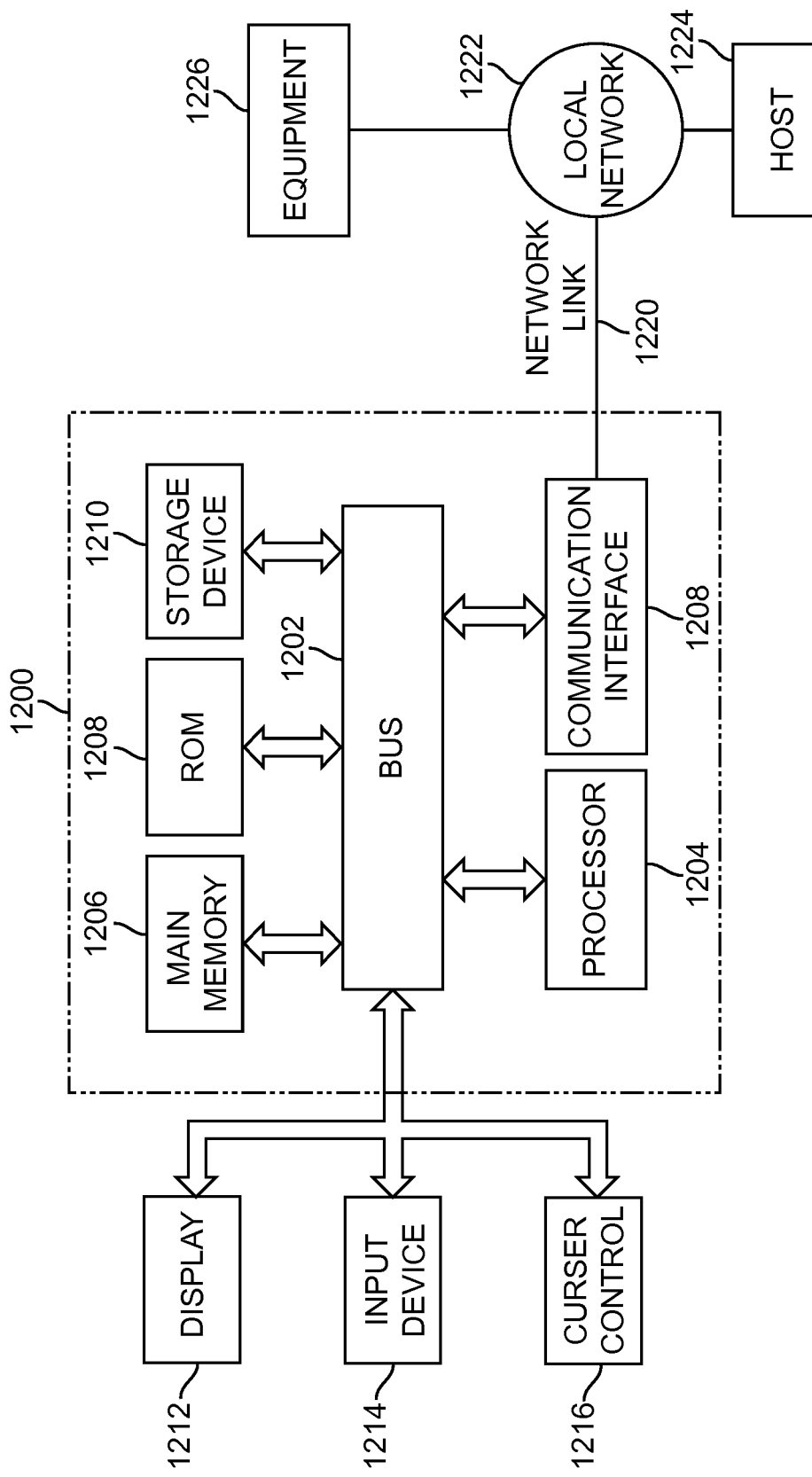
FIG. 5 illustrates an example of a computer system that may be used to implement embodiments described herein.

FIG. 5 is a block diagram that illustrates an embodiment of a computer system 1200 upon which one or more embodiments of the invention may be implemented. Computer system 1200 includes a bus 1202 or other communication mechanism for communicating information, and a processor 1204 coupled with the bus 1202 for processing information. In some cases, the computer system 1200 may be used to implement the first device 12. In other embodiments, the computer system 1200 may be used to implement the second device 14. In further embodiments, there may be two computer systems 1200 for implementing the respective first device 12 and the second device 14.

The computer system 1200 also includes a main memory 1206, such as a random access memory (RAM) or other dynamic storage device, coupled to the bus 1202 for storing information and instructions to be executed by the processor 1204. The main memory 1206 also may be used for storing temporary variables or other intermediate information during execution of instructions to be executed by the processor 1204. The computer system 1200 further includes a read only memory (ROM) 1208 or other static storage device coupled to the bus 1202 for storing static information and instructions for the processor 1204. A data storage device 1210, such as a magnetic disk or optical disk, is provided and coupled to the bus 1202 for storing information and instructions.

The computer system 1200 may be coupled via the bus 1202 to a display 1212, such as a cathode ray tube (CRT), or a flat panel, for displaying information to a user. An input device 1214, including alphanumeric and other keys, is coupled to the bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

The computer system 1200 may be used for performing various functions (e.g., calculation) in accordance with the embodiments described herein. According to one embodiment, such use is provided by computer system 1200 in response to processor 1204 executing one or more sequences of one or more instructions contained in the main memory 1206. Such instructions may be read into the main memory 1206 from another computer-readable medium, such as storage device 1210. Execution of the sequences of instructions contained in the main memory 1206 causes the processor 1204 to perform the processing act(s) described herein. One or more processors in a multi-processing arrangement may also be employed to execute the sequences of instructions contained in the main memory 1206. In alternative embodiments, hard-wired circuitry may be used in place of or in combination with software instructions to implement the invention. Thus, embodiments described herein are not limited to any specific combination of hardware circuitry and software.

The term "computer-readable medium" as used herein refers to any medium that participates in providing instructions to the processor 1204 for execution. Such a medium may take many forms, including but not limited to, non-volatile media, volatile media, and transmission media. Non-volatile media includes, for example, optical or magnetic disks, such as the storage device 1210. A non-volatile medium is an example of a non-transitory medium. Volatile media includes dynamic memory, such as the main memory 1206. A volatile medium is another example of a non-transitory medium. Transmission media includes coaxial cables, copper wire and fiber optics, including the wires that comprise the bus 1202. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to the processor 1204 for execution. For example, the instructions may initially be carried on a magnetic disk of a remote computer. The remote computer can load the instructions into its dynamic memory and send the instructions over a telephone line using a modem. A modem local to the computer system 1200 can receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1206, from which the processor 1204 retrieves and executes the instructions. The instructions received by the main memory 1206 may optionally be stored on the storage device 1210 either before or after execution by the processor 1204.

The computer system 1200 also includes a communication interface 1218 coupled to the bus 1202. The communication interface 1218 provides a two-way data communication coupling to a network link 1220 that is connected to a local network 1222. For example, the communication interface 1218 may be an integrated services digital network (ISDN) card or a modem to provide a data communication connection to a corresponding type of telephone line. As another example, the communication interface 1218 may be a local area network (LAN) card to provide a data communication connection to a compatible LAN. Wireless links may also be implemented. In any such implementation, the communication interface 1218 sends and receives electrical, electromagnetic or optical signals that carry data streams representing various types of information.

The network link 1220 typically provides data communication through one or more networks to other devices. For example, the network link 1220 may provide a connection through local network 1222 to a host computer 1224 or to equipment 1226, which may be any device. The data streams transported over the network link 1220 can comprise electrical, electromagnetic or optical signals. The signals through the various networks and the signals on the network link 1220 and through the communication interface 1218, which carry data to and from the computer system 1200, are exemplary forms of carrier waves transporting the information. The computer system 1200 can send messages and receive data, including program code, through the network(s), the network link 1220, and the communication interface 1218.

Although particular embodiments have been shown and described, it will be understood that they are not intended to limit the claimed inventions, and it will be obvious to those skilled in the art that various changes and modifications may be made without departing from the spirit and scope of the claimed inventions. The specification and drawings are, accordingly, to be regarded in an illustrative rather than restrictive sense. The claimed inventions are intended to cover alternatives, modifications, and equivalents.

What is claimed:

1. A method for determining HRTF, comprising:
   obtaining a plurality of reference images of different respective ears, the reference images associated with respective pre-determined HRTF information;
   obtaining an input image that includes an image of an ear of a subject;
   comparing the input image or information regarding the input image with the reference images or information regarding the reference images, using a processor, to obtain different respective results representing different respective degrees of match; and
   selecting one of the pre-determined HRTF information that corresponds with the one of the reference images providing the result representing the highest degree of match.

2. The method of claim 1, wherein at least one of the reference images comprises an image of an ear, an image of a head, and an image of at least a part of a torso.

3. The method of claim 1, wherein the reference images includes different pairs of front and side reference images, each of the pairs being associated with a corresponding one of the pre-determined HRTF information.

4. The method of claim 1, wherein the input image comprises image data, and the act of comparing comprises comparing the image data of the input image with image data of the reference images.

5. The method of claim 1, wherein the information regarding the input image comprises information extracted from the input image.

6. The method of claim 5, wherein the information extracted from the input image comprises head size, head shape, torso size, torso shape, cavum concha height, cymba concha height, cavum concha width, fossa height, pinna height, pinna width, intertragal incisure width, cavum concha depth, or any combination thereof.

7. The method of claim 1, wherein the HRTF information comprises one or more filter coefficients for a hearing aid.

8. The method of claim 1, wherein the act of obtaining the plurality of reference images is accomplished by accessing a database that stores the plurality of reference images.

9. The method of claim 1, wherein the act of obtaining the information regarding the input image is performed by receiving the information regarding the input image through the Internet.

10. The method of claim 1, further comprising transmitting data regarding the selected one of the pre-determined HRTF information to a device that is in communication with the processor.

11. The method of claim 1, further comprising using the selected one of the pre-determined HRTF information to configure a hearing aid.

12. A device for determining HRTF, comprising:
    a processor configured for:
       obtaining a plurality of reference images of different respective ears, the reference images associated with respective pre-determined HRTF information;
       obtaining an input image that includes an image of an ear of a subject;
       comparing the input image or information regarding the input image with the reference images or information regarding the reference images, to obtain different respective results representing different respective degrees of match; and
       selecting one of the pre-determined HRTF information that corresponds with the one of the reference images providing the result representing the highest degree of match.

13. The device of claim 12, wherein at least one of the reference images comprises an image of an ear, an image of a head, and an image of at least a part of a torso.

14. The device of claim 12, wherein the reference images includes different pairs of front and side reference images, each of the pairs being associated with a corresponding one of pre-determined HRTF information.

15. The device of claim 12, wherein the input image comprises image data, and the processor is configured to perform the act of comparing by comparing the image data of the input image with image data of the reference images.

16. The device of claim 12, wherein the information regarding the input image comprises information extracted from the input image.

17. The device of claim 16, wherein the information extracted from the input image comprises head size, head shape, torso size, torso shape, cavum concha height, cymba concha height, cavum concha width, fossa height, pinna height, pinna width, intertragal incisure width, cavum concha depth, or any combination thereof.

18. The device of claim 12, wherein the HRTF information comprises one or more filter coefficients for a hearing aid.

19. The device of claim 12, wherein the processor is configured to perform the act of obtaining the plurality of reference images by accessing a database that stores the plurality of reference images.

20. The device of claim 12, wherein the processor is configured to perform the act of obtaining the information regarding the input image by receiving the information regarding the input image through the Internet.

21. The device of claim 12, wherein the processor is further configured for generating a signal to cause data regarding the selected one of the pre-determined HRTF information to be transmitted to a device that is in communication with the processor.

22. The device of claim 12, wherein the selected one of the pre-determined HRTF information is for configuring a hearing aid.

* * * * *